No Printed Specification Available
9790X
S. H. Lacier,
Cook Stove.
Patented June 28. 1836
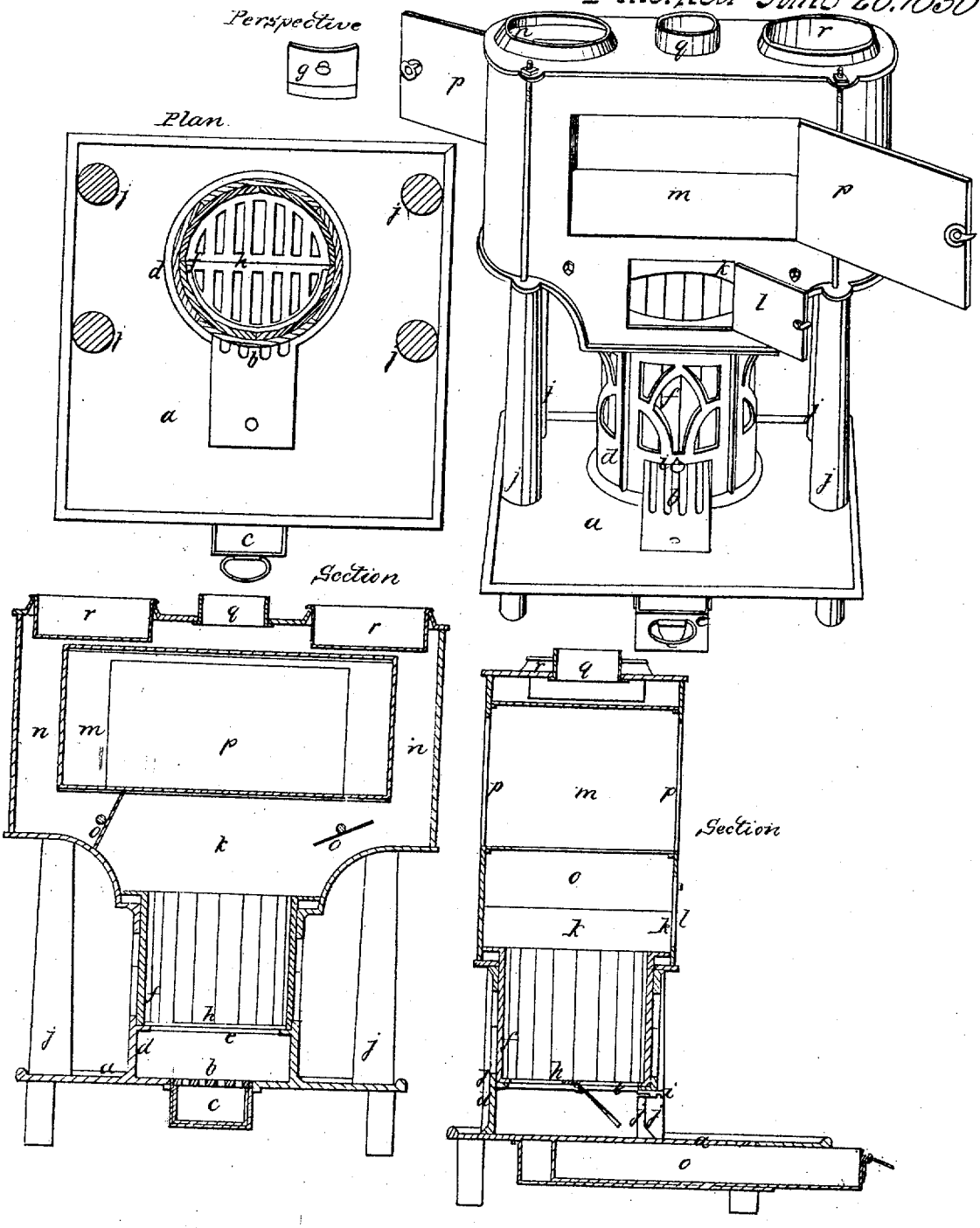

9790X

No 10

June 28. 1836 77

Sebastian H. Lacier, Macungy, Pa.

Letters Patent.

The Schedule referred to in these Letters Patent and [illegible] making part of the same, containing a description in the words of the said Sebastian H. Lacier, himself, of his improvement in the construction of Cooking Stoves.

To all to whom these presents shall come.

Be it known that I, Sebastian H. Lacier, of Macungy, in the County of Lehigh and State of Pennsylvania, have invented a new and useful improvement in the manner of constructing Cooking Stoves that are to be used with coal as fuel; and that the following is a full and exact description of the construction and mode of operation, as invented by me.

The nature of my invention is such, as to present a combination of parts, which may have been already used separately and singly in the construction of Stoves, but not in the united arrangement under which I now present them, as being better calculated for the combustion of coal as fuel and particularly anthracite or stone coal, than any with which I am acquainted intended to be used for cooking: the manner of constructing which is fully set forth in the following description. In the centre of a square plate which is to form the hearth, supported upon feet at each corner, I make a long opening from what is to be the front to the hind end; this opening is covered with a plate, having at one end a grate of bars running lengthwise, at such distances apart as to retain the larger cinders, for allowing combustion, while the ashes &c will be received in a [illegible] drawer [illegible] secured to the lower side of [illegible] for the purpose. Above this opening, is a

9790X to be firmly secured on the top of the plate, and towards
the back end, a perpendicular cylinder open at each end
the circumference may be [illegible] made of as much in
open & ornamental work, in the casting thereof as may
be desired and the diameter proportioned to that of the inner
or enclosed cylinder for holding the fuel for combustion
which must be proportioned to the size and stove wished
for. This inner cylinder is to be supported upon flanges
from the interior of the surrounding one projecting
therefrom, at such a distance from the hearth as to
allow of a draught opening in the latter one in front:
and upon these same flanges is to be supported first
the grate & over it the inner cylinder. The grate is con-
structed of two semicircles placed horizontally in
together; the front one being moveable upon a hinge
joint, so as to fall down in front, when the pin is
withdrawn by which it is supported being the means
by which the grate is discharged of its contents for
cleaning. The outer cylinder is to be constructed at
its top: with the lower plates of the stove, which is
to be constructed above it for the reception of the
cooking apparatus, being additionally supported by
two pillars at each end. These pillars will be some-
what taller than the cylinder because the lower plate
is to descend by a curve from them, to the cylinder, in
thereby leaving a considerable space enclosed between
the bottom of the oven & the top of the cylinder intended
as an air chamber, for that which is rarefied and
furnished with a door in front for the supply of
fuel. also the top of the inner cylinder will rise
somewhat above that of the outer one and be
united to a separate plate which will join the
curved ends of the stove at [illegible] distance above
the

9790X the bottom plate already mentioned, so as to leave a
hollow space between them. The stove above the pil-
lars will present the appearance of the ordinary tin
plate one, being of an oblong shape and the cylinder in
the centre of the bottom plate.

The oven which is placed over the air chamber oc-
cupies nearly the whole length with the exception
of a hollow space between the end plates of it and
the outside ones of the stove the latter being curved
outwards in the usual way. These form the draught
passages for the circulation of the heat &c. and are to be
closed by means of dampers, turning on central axles one
being furnished to each end of the oven. The axle pro-
jecting beyond the front side of the stove presents a
square head, to which is fitted a crank handle, by
which the aperture is opened or closed as the draught
is desired. The oven has doors on each side & above
it the draught continues between the top plate
thereof and that of the stove, to the aperture for the
smoke which is placed in the middle; and at each
end of the top plate are holes for cooking vessels;
and the ordinary fixtures of cleaning or [illegible]
are to be used. For the purpose of preventing
the gas from escaping while the vessels are remov-
ing or changing, I use a pan with a flange around
its upper edge to hang within the holes from the
top plate; and into this fits the bottom of the cooking
vessel; or the vessel may have around its circumfer-
ence a flange as high up as it may be desired that the
vessel shall descend into the space between the top
plates; upon which flange it will rest upon the sloping
[illegible] around the opening of the hole.

The pillars on which the stove rests, are cast hollow,
so-

9790X so as to admit a rod through them and the bottom plate & hearth, furnished with screws and nuts; and as said pillars are divided longitudinally for the convenience of casting there will be required at top and bottom of each, a socket or cup into which the end of the pillar will rest, & the rim of which will form a stay or check, to the separation of the halves when they are united & set up.

Having now described the nature of the invention, and the manner in which it is carried into effect, I would have it understood that I do not claim any of the parts separately; but I do claim as my invention the combining of the various parts in the manner above described.

In testimony that the above is a full description of my improvement as invented by me I have hereunto set my hand this second day of May eighteen hundred & thirty six Witnesses
Henry Stone
B. K. Morsell Sebastian M. Lacias.

[illegible]

1140 [illegible]

June 28, 1836
(Patented June 28. 1836)

Drawing